F. C. A. RICHARDSON.
SPECTACLES.
APPLICATION FILED SEPT. 29, 1916.
1,233,908.
Patented July 17, 1917.
2 SHEETS—SHEET 1.
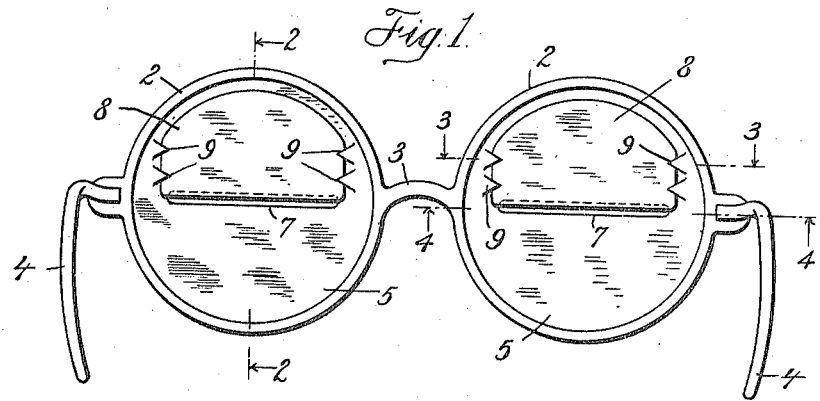
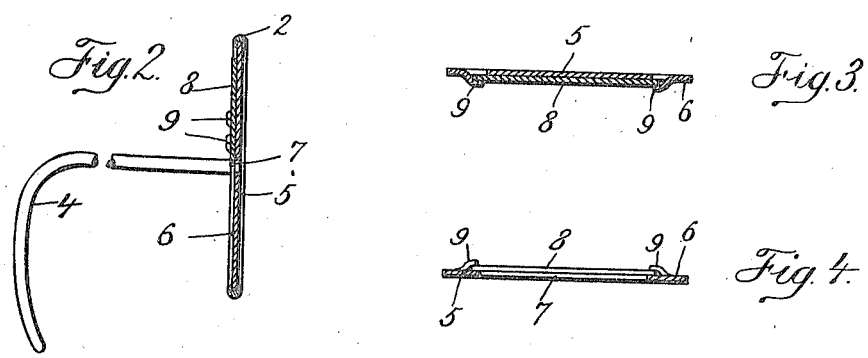
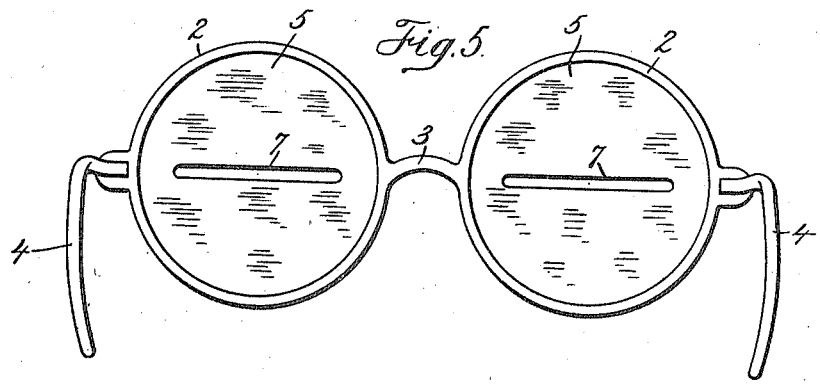
INVENTOR
Frank C. A. Richardson
BY
Lewis J. Doolittle
ATTORNEY F. C. A. RICHARDSON.
SPECTACLES.
APPLICATION FILED SEPT. 29, 1916.
1,233,908.
Patented July 17, 1917.
2 SHEETS—SHEET 2.
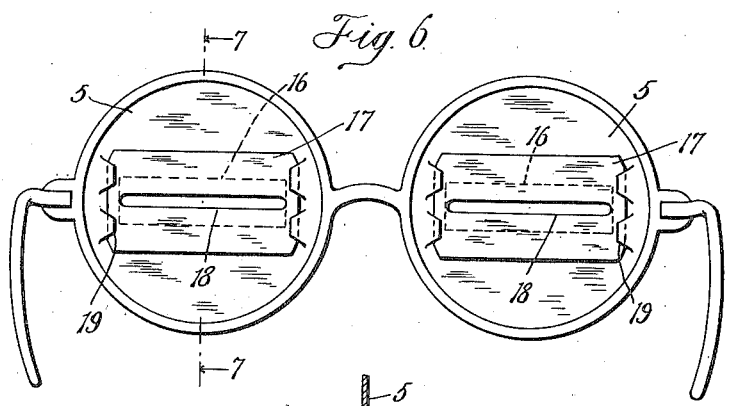
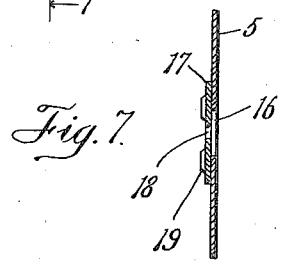
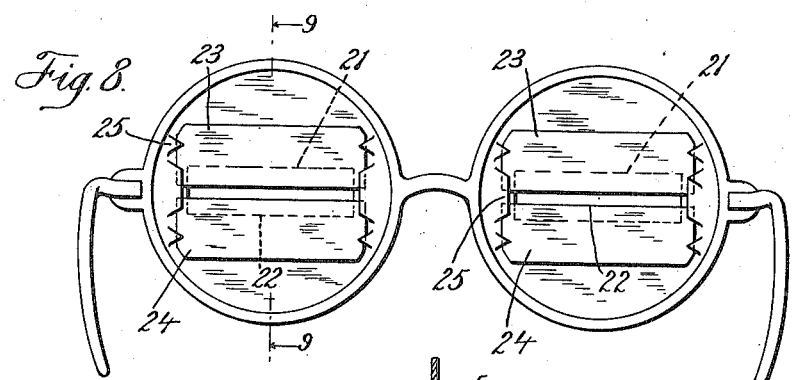
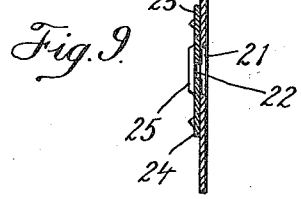
INVENTOR
Frank C. A. Richardson
BY
Lewis J. Doolittle
ATTORNEY

UNITED STATES PATENT OFFICE.

FRANK C. A. RICHARDSON, OF NEW YORK, N. Y.

SPECTACLES.

1,233,908.   Specification of Letters Patent.   Patented July 17, 1917.

Application filed September 29, 1916. Serial No. 122,762.

*To all whom it may concern:*

Be it known that FRANK C. A. RICHARDSON, a citizen of the United States, and resident of the city, county, and State of New York, has invented certain new and useful Improvements in Spectacles, of which the following is a specification.

This invention relates to spectacles, having more particular reference to spectacles designed to protect the eyes from strong rays of light.

The invention has for an object to provide an improved spectacle for this purpose in which the desired protection for the eye is obtained by obscuring or shutting off the non-effective light rays.

For further comprehension of the invention and of the objects and advantages thereof reference will be had to the following description, taken in connection with the accompanying drawings, the various novel features of the invention being more particularly pointed out in the appended claims.

Figure 1 of the drawings is a rear or interior face view of a pair of spectacles embodying the invention.

Fig. 2 is a transverse section on the line 2—2 of Fig. 1.

Figs. 3 and 4 are horizontal sectional views taken respectively on the lines 3—3 and 4—4 of Fig. 1 and looking in opposite directions, as indicated.

Fig. 5 is a similar view to Fig. 1, showing a modified embodiment of the invention.

Fig. 6 is a similar view to Fig. 1, showing another modification.

Fig. 7 is a detail cross section on the line 6—6 of Fig. 6 showing only the screen.

Fig. 8 is a similar view to Fig. 1, of a further modification.

Fig. 9 is a detail cross section on the line 9—9 of Fig. 8 and showing only the screen.

The frame or mounting for the spectacle may be of any desired type or construction, that herein shown comprising the rims 2, bridge 3 and bows 4.

According to my invention, screens 5, made of light resisting or obstructing material, preferably of opaque material such, for instance, as celluloid, hard rubber or metal take the place of the usual lenses. The rear or inner surfaces of the screens, which are the surfaces adjacent the eyes, indicated at 6 in the drawings, are of dark color, preferably black, and have a dull finish to render them light absorbing and non-reflecting.

Formed in each screen midway between its upper and lower edge is a narrow, horizontally disposed, rectilinear slot 7. These slots may be made adjustable in width, as shown in Figs. 1 to 4, by providing slides 8 which are mounted, one on each screen, on the rear face thereof and are adjustably held thereon by frictional contact with the extremities of tongues 9 struck out of the screens and extending over the side edges of the slides, the tongues 9 also serving as guides for the slides 8.

In Fig. 5 I have shown a modified form of the invention in which the slides are dispensed with and which may be preferred in some cases, as for instance, when the slots 7 in the screens 5 are constructed to suit an individual purchaser, in which case no adjustment of the slots might be desired.

In Figs. 6 and 7 I have shown another modification which provides for vertical adjustment of the slots.

In this modification the screens 5 are formed with comparatively wide horizontal slots or openings 16 partially covered by slides 17 in which are formed the sight slots 18, the slides being held in position by tongues 19 struck up from the screen.

With this arrangement the position of the slots may be adjusted vertically with regard to the frame of the spectacles to bring the slots into the desired position with respect to the eyes of the wearer. Also the slots may be varied in width by moving the slides so as to bring the slots adjacent the upper or lower edges of the openings 16.

In Figs. 8 and 9 I have shown a further modification adapted to permit both of vertical adjustment of the slots and of adjustment of the width thereof in any position of the slots.

In this modification the screens 5 are also formed with comparatively wide horizontal slots or openings 21 while the sight slots 22 are formed between co-acting slides 23 and 24 held in place by tongues 25 as in the previously described modifications. With this construction any desired adjustment both of the width and vertical position of the sight slots, within the limits defined by the openings 21, may be obtained.

It will be apparent that within the range permitted by the slots the vision of the wearer will not be in any way obscured by these spectacles while the quantity of light striking the eye through the slots is very small and adequate protection from strong light such as sunlight, snow glare or the like is afforded. Also the particular horizontal, rectilinear disposition of the slots gives the wearer a normal lateral range of vision, while by reason of the fact that the normal tendency is to confine attention to objects within a limited vertical range the vision of the wearer is to all intents and purposes of normal range.

The adjustability of the slots permits of the manufacture of the screens in quantities and enables each purchaser to adjust the slots to his individual requirements and also for different uses.

It has been found that the use of these spectacles when observing moving pictures reduces the flicker and resultant eye strain and produces a sharper picture with an increased stereoscopic effect to a certain extent.

These screens may also, if desired, be fitted into a frame in addition to the ordinary lenses, the screens and lenses lying face to face.

What I claim is:

1. A screen for spectacles formed of opaque material having a slot formed therein for the passage of light to the eye, and a slide of similar material adjustably mounted on said screen to have rectilinear movement and adapted to vary the width of the said slot evenly throughout the length of said slot.

2. A screen for spectacles formed of opaque material having a slot formed therein for the passage of light to the eye, a slide of similar material for varying the width of the slot, and tongues formed integrally from said screen and engaging said slide to hold and guide the latter.

3. A screen for spectacles formed of light resisting material having a relatively wide horizontally disposed rectilinear slot formed therein, and a pair of slide members mounted on said screen and adjustable toward and away from one another, said slide members being adapted to partially cover the said relatively wide slot and provide between them a relatively narrow slot.

Signed at the city, county and State of New York, this 15th day of September, 1916.

FRANK C. A. RICHARDSON.